United States Patent [19]

Van Zyl

[11] Patent Number: 4,635,348
[45] Date of Patent: Jan. 13, 1987

[54] MANUFACTURE OF ELECTRICAL COILS

[76] Inventor: Theodore D. Van Zyl, 3 Villa Grütchen, Jan Cilliers Park, Welkom, South Africa

[21] Appl. No.: 660,645

[22] Filed: Oct. 15, 1984

[30] Foreign Application Priority Data

Oct. 14, 1983 [ZA] South Africa .................. 83/7661

[51] Int. Cl.⁴ ............................................. H02K 15/12
[52] U.S. Cl. ......................................... 29/596; 264/22; 264/272.13; 264/272.19; 310/43
[58] Field of Search .................. 29/596; 204/159.11, 204/159.21; 156/272.4, 272, 53; 310/254, 261, 273; 250/492.1; 264/22, 272.13, 272.19, 272.20; 310/43

[56] References Cited

U.S. PATENT DOCUMENTS

| | | | |
|---|---|---|---|
| 2,937,408 | 5/1960 | Limpel | 29/596 UX |
| 3,129,195 | 4/1964 | June et al. | 204/159.21 |
| 4,186,041 | 1/1980 | Gantts et al. | 156/272.4 |
| 4,370,188 | 1/1983 | Otty | 29/596 X |

Primary Examiner—Carl E. Hall
Attorney, Agent, or Firm—Stevens, Davis, Miller & Mosher

[57] ABSTRACT

Electrical coils for electrical machines are prepared by forming a number of parallel conductors side by side and separating the conductors and surrounding the conductors with insulating material impregnated with thermosetting resin. The resin is cured by radiating the coil with radio frequency electro magnetic radiation.

13 Claims, 1 Drawing Figure

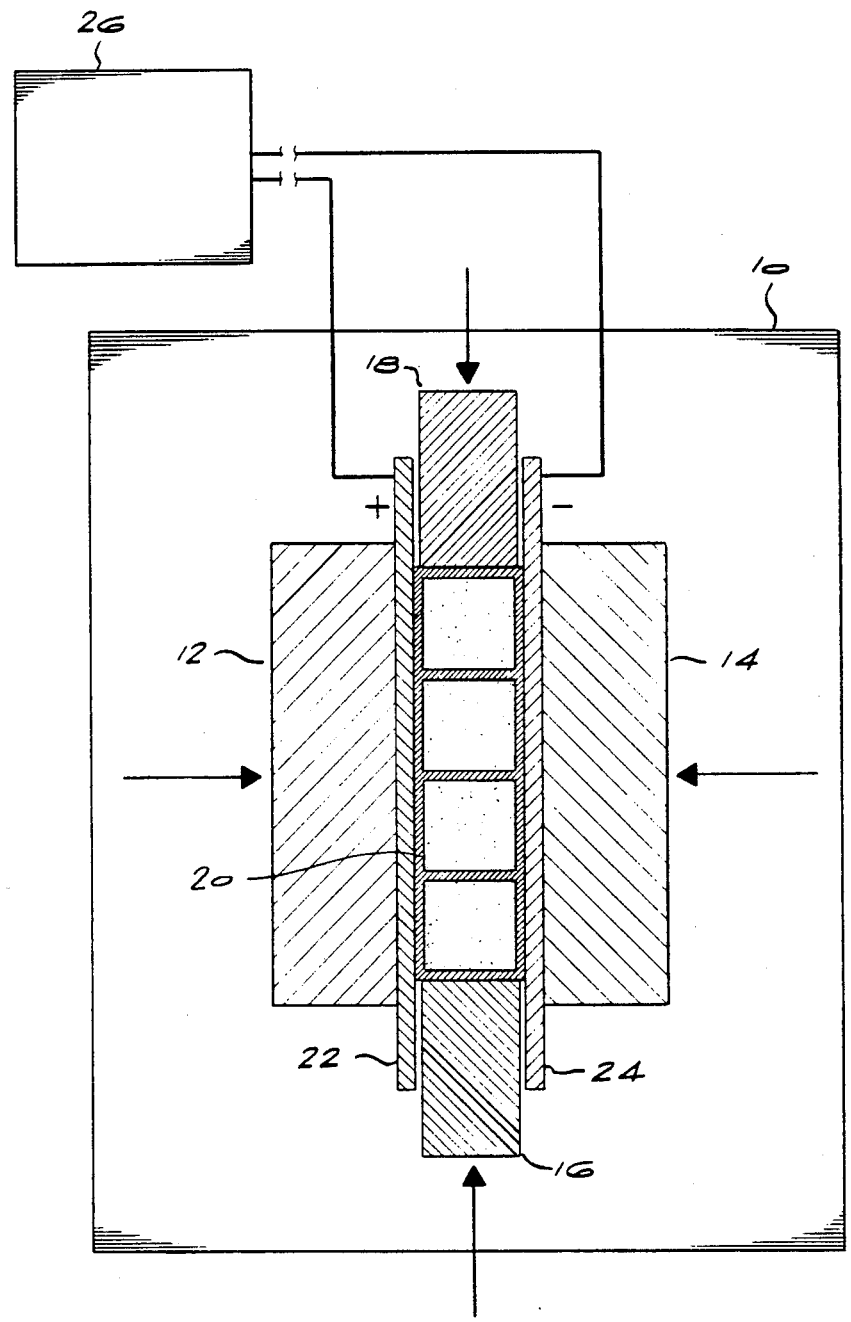

MANUFACTURE OF ELECTRICAL COILS

BACKGROUND TO THE INVENTION

This invention relates to manufacture or production of electrical components in which insulation is provided at least in part by a heat curable resin.

The invention has particular although not exclusive application to the production of coils for electrical machines which are prepared for insertion into slots provided in a rotor or stator body. The invention will be described in relation to such coils but embodiments of the invention can be provided for the preparation of a wide range of electrical components.

It is well-known to prepare components, including electrical joints for such components, by preparing the conductors in their required configuration with or without special insulation and then adding a resin or resin impregnated wraps. The resin is cured by heating.

During heating significant forces may be simultaneously or intermittently applied to restrict the overall size of the finished component or joint.

In any event although such procedures have been practised for several years complete curing is not always possible and can take, especially for heavy duty components, very many hours.

It is an object of the invention to provide an improved process.

SUMMARY OF THE INVENTION

According to the invention a process for preparing electrical components which are prepared or formed in association with curable insulating resins includes the step of curing the resin by subjecting the component to radio frequency radiation.

The process may include the step of simultaneously subjecting the prepared component to pressure to constrain or reduce the overall size of the component during curing of the resin.

The process may include surrounding or encapsulating the prepared component before curing the resin.

The radio frequency radiation is preferably in the range of frequencies of 10 to 50 MHz, and more preferably 20 to 27 MHz.

In some applications lower frequencies are used to soften the resin while pressure is first applied and the frequency increased after full pressure has been applied. When the process is applied to the production of coils the pressure can be applied in such a manner that the centre portion of the coil length has pressure applied to it first such that excess resin flows towards the ends of the coil as the pressure is increased.

The process may comprise shaping a number of solid electrical conductors to form a coil for an electrical machine, placing resin rich insulation between and around each conductor, confining the coil in a press to constrain or reduce the overall size of the coil, and applying radio frequency radiation to cure the resin.

BRIEF DESCRIPTION OF THE DRAWING

An apparatus and process according to the invention will now be described by way of example with reference to the accompanying schematic drawing which is a cross-sectional view of the apparatus.

DESCRIPTION OF A PREFERRED EMBODIMENT

The embodiment to be described is for forming stator coils for use in an electrical machine. Such coils each comprise a number of rectangular cross-sectional copper conductors extending in use lengthwise through the stator on top of one another. The conductors are joined together for fitting into a slot of the stator, but are electrically insulated from one another, and surrounded by insulation. The coil is suitably shaped so as to fit snugly into slots, and overhang the ends thereof, provided in a stator body which is in turn mounted in a frame of the electrical machine.

At present such coils are prepared by shaping the conductors, each being provided with an epoxy mica wrap, and placing the conductors together in a press. Heat is then applied to cure the resin, such heat being generated in electrical heating elements mounted in the press or by steam. The press confines the overall dimensions of the coil so that after curing of the resin in the epoxy mica wrap, the coil fits snugly into slots in the stator.

In fact in practice it is usually necessary to apply the epoxy mica wrap in stages, curing each layer before adding further layers of epoxy mica wrap. Further, after each curing stage it is necessary to allow the coil to cool down before further layers of epoxy resin wrap can be added. The copper conductors heat up during the prolonged curing to temperatures usually about 150° C. and this causes considerable expansion of the conductors. It is believed that this expansion, and the contraction during cooling between stages of the process and at the end of the processing, has a detrimental effect. Good bonding at the surface of the conductors, between the conductors and the insulation, is interfered with.

Further, as the copper conductors are good heat conductors there is a tendency for curing near the surface of the conductors to be impaired by rapid heat dissipation in those regions adjacent the conductor surface, especially during initial curing when the heat is first applied to the coil.

Thus, curing remote from the conductor surface takes place more rapidly and hinders satisfactory curing near the conductor surface. Unsatisfactory or uneven curing also results from the fact that during initial curing when the heat is first applied a significant temperature drop is experienced when the hot pressure plates are first brought into contact with the outside surfaces of the insulated coil.

These difficulties are presently overcome or at least compensated for by providing generous amounts of insulation so that such imperfections and perhaps insulation weakness may not manifest themselves in the electrical machines using coils made by such processes. On the other hand by increasing the volume of insulation used there is a wastefulness in the use of insulation material and mica in particular (mica is, for example, already in short supply worldwide) and the overall dimensions of coils made are unnecessarily large as compared with what is required using the described improved process. The increase of overall size of each insulated coil reduces the maximum rating of an electrical machine per unit volume that is possible, or conversely, smaller machines can be made having increased ratings if the overall size of each insulated coil is reduced.

Referring to the drawing, the apparatus of this invention includes a frame 10 supporting planar pressure panels 12 and 14 arranged to be pressed towards one another. Two longitudinal blocks 16 and 18 are mounted in the frame 10 and arranged to be pressed towards one another. A multi-layer copper coil 20 is shown in position in the apparatus having four separate conductors which are surrounded and separated by epoxy mica wrap insulation impregnated with a phenol formaldehyde resin. Aluminium plates 22 and 24 are provided at each side of the coil 20 and a radio frequency generator 26 is connected between the plates 22 and 24.

In the process of the invention, the conductors of the coil 20 are prepared with the required total number of layers of epoxy mica wrap and placed in the apparatus. Pressure is applied by the panels 12 and 14 and the blocks 16 and 18 and the generator 26 is switched on. Radiation from the generator 26 cures the resin. In a typical situation for coils of a heavy duty machine curing takes place in approximately one hour.

As compared with conventional heating the copper conductors of the coil 20 do not rise in temperature to any great extent during curing and curing of the resin takes place evenly through the overall depth of the insulation layers. This is in contrast to conventional heating where curing at least tends to take place unevenly. Typically, curing using conventional heating takes place initially at the outer regions of the insulation adjacent heated pressure plates. This means that curing, especially in the insulation centrally and between the layers of copper conductors, is especially uncertain and uneven.

The overall curing time is much reduced by the process according to this invention because curing is quicker. Also, the total of epoxy mica wrap required can be applied in one stage and no intermediate cooling and stoppages for adding further epoxy mica wrap are required. In fact, the process time can be reduced to as little as one fifth of the time required for conventional curing processes. Further, because good bonding is achieved, especially between the insulation and the surfaces of the conductors of the coil 20 when using the radio frequency radiation, less depth of insulation can be used satisfactorily than hitherto. This means for any given stator slot size a greater cross section or greater volume of copper material can be used in each slot to increase correspondingly the rating of a given electrical machine if desired. The good bonding is achieved because curing is more even and efficient, and the conductors do not expand significantly and contract during this curing process.

It will be appreciated that as the thickness of insulation between the conductors and the stator core can be less while providing safe electrical insulation properties, a better heat transfer between the conductors and the stator core is achieved during operation of the machine.

Corona discharge problems which are related to high temperatures are therefore reduced during operation of the electrical machine because heat is conducted away from the conductors more effectively therefore lessening the problem of corona discharge.

Embodiments of the invention enable machines to be repaired much more quickly than hitherto because the process time for curing the resin is greatly reduced.

It is possible in some cases to cure the resin using radio frequency radiation in situ. That is, after the coils 20 have been placed in a machine stator slot or in a machine rotor slot as appropriate. Also, with suitable modifications it is possible to radiate the resin for curing the resin by applying radio frequency energy to the ends of the conductors or at least beyond the region of insulation. The energy is conducted along the conductors and arranged to radiate from the conductors into and cure the resin as required.

The pressure surfaces may be treated with a release agent before the coil is placed in the apparatus. The coil may alternatively or additionally be surrounded with a plastics or like material foil before being placed in the apparatus.

The process may be carried out while the coil is held in a coil press of the kind already known in the art and used for prior art radiant heating curing for example.

Non-impregnated insulating material may be used to separate and wrap around the conductors. In that case, thermosetting resin is added by vacuum impregnation and/or dipping the coil in a bath containing thermosetting resin before the coil is subjected to radio frequency radiation.

I claim:

1. A process of preparing electrical coils comprising an array of parallel conductors placed side by side for placement in slots in electrical machines comprising separating the conductors and surrounding the array of conductors with insulation material containing thermosetting resin, applying pressure to hold the conductors together side by side, and radiating the resin with electro magnetic radiation in the radio frequency range to cure the resin.

2. A process according to claim 1, including radiating the resin with radiation in the range of frequencies of 10 to 50 MHz.

3. A process according to claim 2, in which the range is 20 to 27 MHZ.

4. A process according to claim 1, in which the coil is held in a coil press during radiation of the resin.

5. A process according to claim 1, in which the coil is pressed into a slot in a machine rotor to hold the array of conductors together side by side and radiating the resin while the coil is pressed into the slot.

6. A process according to claim 1, in which the coil is pressed into a slot in a machine stator to hold the array of conductors together side by side, and radiating the resin while the coil is pressed into the slot.

7. A process according to claim 1, including applying the radiation to the resin by connecting a radiation generator to the ends of the conductors forming the coil.

8. A process according to claim 1, in which the resin is phenol formaldehyde resin.

9. A process for assembling electrical machines having electrical coils including a number of electrical conductors extending side by side along the machine and supported in respective slots formed in and distributed around a stator of the machine for supporting the coils, the process comprising separating the conductors by insulating material containing thermosetting resin, wrapping material containing thermosetting resin around the conductors to form the resin, placing the resin in a respective slot in the stator, pressing the resin firmly into the slot, and radiating the resin while pressing the resin firmly into the slot with electro magnetic radiation in the radio frequency range to cure the resin.

10. A process according to claim 9, in which the radiation is supplied by connecting a radiation generator to the ends of each of the conductors.

11. A process for assembling electrical machines having electrical coils including a number of electrical conductors extending side by side along the machine and supported in respective slots formed in and distributed around the rotor of the machine for supporting the coils, the process comprising separating the conductors by insulating material containing thermosetting resin, wrapping material containing thermosetting resin around the conductors to form the resin, placing the resin in a respective slot in the rotor, pressing the resin firmly into the slot and radiating the resin while pressing the resin firmly into the slot with electro magnetic radiation in the radio frequency range to cure the resin.

12. A process according to claim 11, in which the radiation is applied by connecting a radiation generator to the ends of each of the conductors.

13. A process of preparing electrical coils comprising an array of parallel conductors placed side by side for placement in slots in electrical machines comprising separating the conductors and surrounding the array of conductors with insulating material, impregnating the insulating material with thermosetting resin, applying pressure to hold the conductors together side by side, and radiating the resin with electro magnetic radiation in the radio frequency range to cure the resin.

* * * * *